Figure 1:
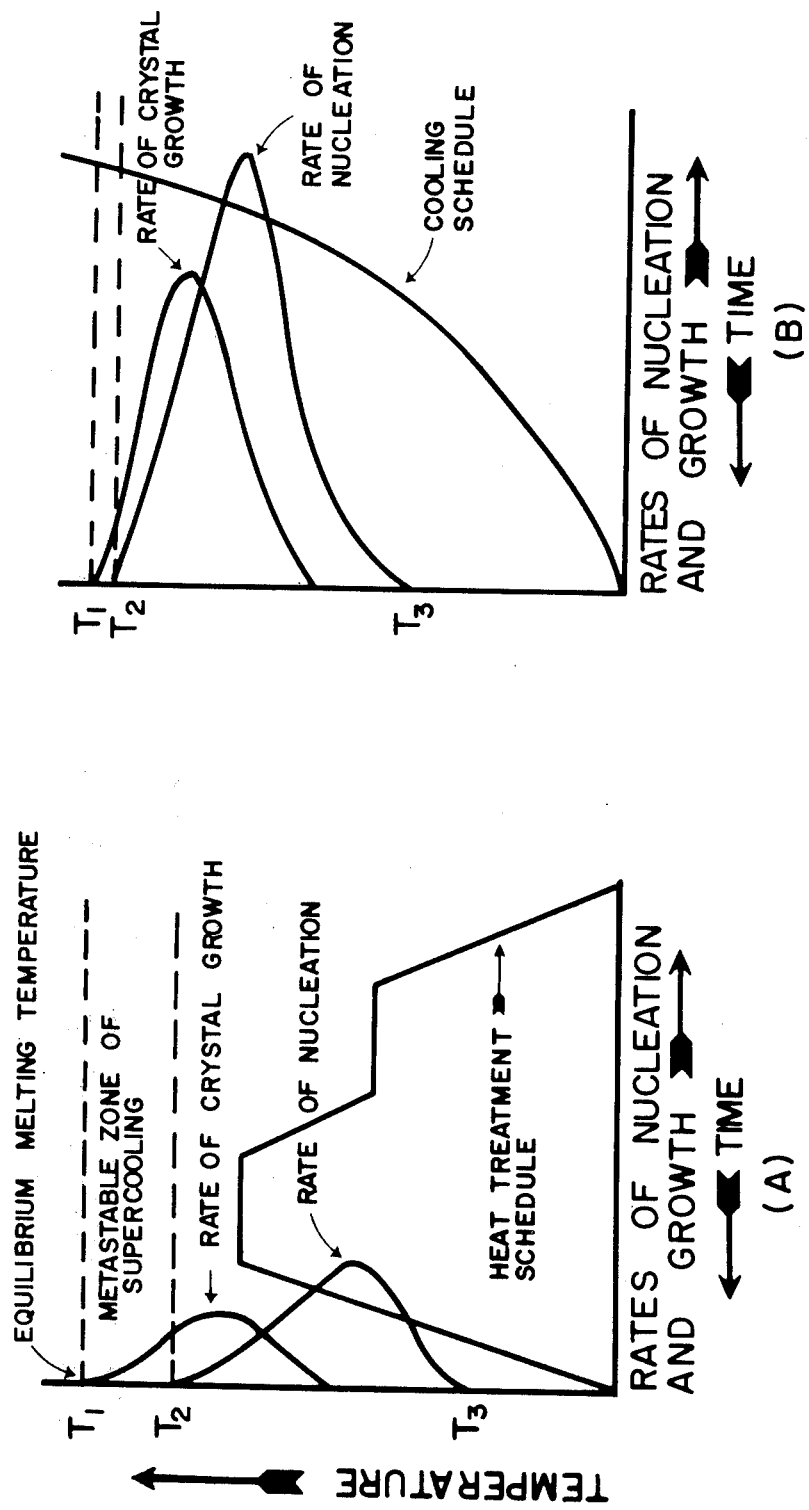

United States Patent [19]

Grossman

[11] 3,985,533

[45] Oct. 12, 1976

[54] SPONTANEOUSLY-FORMED BETA-SPODUMENE GLASS-CERAMICS

[75] Inventor: David G. Grossman, Corning, N.Y.

[73] Assignee: Corning Glass Works, Corning, N.Y.

[22] Filed: Mar. 19, 1975

[21] Appl. No.: 559,727

[52] U.S. Cl. .................................. 65/33; 106/39.7; 106/39.8
[51] Int. Cl.² ...................... C03B 32/00; C03C 3/22
[58] Field of Search ............... 106/39.6, 39.7, 39.8; 65/33

[56] References Cited
UNITED STATES PATENTS

| | | | |
|---|---|---|---|
| 3,489,577 | 1/1970 | Tashiro | 106/39.7 |
| 3,804,608 | 4/1974 | Gaskell et al. | 106/39.7 |
| 3,856,497 | 12/1974 | Hummel | 106/39.7 |

Primary Examiner—Winston A. Douglas
Assistant Examiner—Mark Bell
Attorney, Agent, or Firm—Clarence R. Patty, Jr.; Clinton S. Janes, Jr.

[57] ABSTRACT

The instant invention relates to the production of articles exhibiting the physical properties and internal microstructure of glass-ceramic materials but which can be formed spontaneously from a molten glass, i.e., no heat treatment of a glass body is required to cause the crystallization in situ thereof, as is demanded in the manufacture of conventional glass-ceramic articles. More particularly, this invention is concerned with the production of glass-ceramic articles having compositions within the $Li_2O$-$Al_2O_3$-$SiO_2$-F field which are nucleated with $TiO_2$, wherein beta-spodumene solid solution constitutes the predominant crystal phase, and which can be formed spontaneously from a molten glass batch.

3 Claims, 3 Drawing Figures

SPONTANEOUSLY-FORMED BETA-SPODUMENE GLASS-CERAMICS

U.S. applications Ser. Nos. 559,725 and 559,787, filed concurrently herewith by the present applicant and Ser. No. 559,732, filed concurrently herewith by J. E. Flannery and D. R. Wexell, disclose the production of spontaneously-formed glass-ceramic articles wherein a fluormica comprises the predominant crystal phase. U.S. applications Ser. Nos. 559,789 and 559,726, filed concurrently herewith by the present applicant describe the production of spontaneously-formed glass-ceramic articles wherein mullite and celsian, respectively, constitutes the primary crystal phase. U.S. applications Nos. 559,731 and 559,730, filed concurrently herewith by H. L. Rittler, discuss the formation of spontaneously-formed glass-ceramic articles wherein BaO and/or SrO-$Fe_2O_3$-$SiO_2$ solid solution and carnegieite and/or nepheline solid solution, respectively, comprises the principal crystal phase. U.S. application Ser. No. 559,788, filed concurrently herewith by G. H. Beall, P. E. Blaszyk, and W. T. Brydges, III, describes the manufacture of spontaneously-formed glass-ceramic articles wherein beta-spodumene solid solution constitutes the predominant crystal phase. U.S. application Ser. No. 559,786, filed concurrently herewith by G. H. Beall, discloses the production of spontaneously-formed glass-ceramic articles wherein alpha-quartz solid solution comprises the primary crystal phase.

The art of glass-ceramics is founded in U.S. Pat. No. 2,920,971. That patent describes the production of glass-ceramic articles as contemplating the controlled heat treatment of a parent or precursor glass body. Therefore, as is explained therein, the classic method for making glass-ceramic articles involves three general steps. First, a glass-forming bath, in which a nucleating agent is customarily included, is melted. Second, this melt is simultaneously cooled to at least within and, more commonly, below the transformation range to provide an essentially crystal-free glass and an article of a desired configuration shaped therefrom. Third, this glass shape is heated to a temperature above the transformation range thereof to cause the growth of crystals in situ. [The transformation range has been deemed to comprise the temperature at which a molten mass is converted into an amorphous solid and has generally been defined as lying in the vicinity of the annealing point of a glass.] In the majority of cases, the last or crystallization step is divided into two functions. Thus, the glass body will be heated initially to a temperature slightly above the transformation range and maintained thereat for a period of time sufficient to obtain substantial nucleation. Subsequently, the nucleated body will be heated to a still higher temperature, commonly above the softening point of the parent glass, and held thereat for a sufficient length of time to promote the growth of crystals on the nuclei.

This careful heat treatment of the glass body yields a homogeneously crystallized article wherein the crystals are relatively uniform in size. In general, glass-ceramic articles are predominantly crystalline and the crystals, themselves, very fine-grained. Nevertheless, for a more detailed discussion of the theoretical aspects and practical considerations involved in the structure and production of glass-ceramic articles, reference is made to U.S. Pat. No. 2,920,971, supra.

It has frequently been observed, during the cooling of molten batches to form glass bodies, that crystallization will occur, the crystals originating at the surface and growing inwardly into the glass body. This action has been denominated "normal" devitrification and is almost always looked upon as undesirable since the resultant microstructure consists of non-uniformly sized, relatively coarse-grained crystals which are commonly oriented in a plane perpendicular to the surface. Such a microstructure customarily leads to a mechanically-weak body.

This "normal" devitrification process differs in basic mechanism from the production of glass-ceramics because it involves crystallization taking place at or near the liquidus temperature. Another example of crystallization happening at or near the liquidus temperature is found in the fusion casting of refractory ceramic materials. In contrast to those situations, the production of glass-ceramic articles via the controlled heat treatment of precursor glass bodies utilizes temperatures considerably below the liquidus, thereby providing a larger degree of supercooling, such that the crystallization process occurs at a much higher viscosity level where time can play a role in crystal growth.

The instant invention is concerned with spontaneously-formed glass-ceramic articles. These articles demonstrate physical properties and internal microstructures similar to those of classic glass-ceramic bodies, but can be produced by merely cooling a glass-forming melt to a solid body without the need for a subsequent heat treatment of the body. Hence, certain compositions within the $Li_2O$-$Al_2O_3$-$SiO_2$-$TiO_2$-F field, when cooled from a melt, can yield a uniformly fine-grained, homogeneous dispersion of crystals within a glassy matrix. Thus, without any further heat treatment, those bodies will be highly crystalline, i.e., greater than about 50% by volume crystalline, and the crystals, themselves, will have diameters less than about 5 microns.

An examination of FIG. 1 can be of help in appreciating the difference in crystallization mechanism obtaining between the spontaneously-formed glass-ceramic articles of the instant invention and conventional glass-ceramic bodies. The critical element is believed to be the overlap observed in the rate curves for nucleation and crystallization drawn therein. Hence, below the equilibrium melting temperature of the viscous liquid $T_1$, there is a temperature range ($T_1$-$T_2$) wherein nuclei do not develop at a perceptible rate. This temperature interval is designated the metastable zone of supercooling. In the case of conventional glass-ceramic compositions, no crystals develop at or just below the metastable zone because of the very low nucleation rate there such that no growth sites are provided for crystals. Thus, nucleation occurs within the $T_2$-$T_3$ temperature range.

The crystallization process involved in the production of conventional glass-ceramic articles is pictured in FIG. 1(A). As is illustrated there, crystallization is secured by first reheating the supercooled liquid, i.e., the precursor glass body, into the zone of maximum nucleation, maintaining thereat for a period of time sufficient to obtain the substantial development of nuclei, and then further heating the nucleated body into the region of maximum crystal growth and holding thereat for a sufficient length of time to achieve the desired crystal growth.

FIG. 1(B) represents the contrasting nucleation-crystallization relationship constituting the basis of spontaneously-formed glass-ceramics. As can be observed, the metastable region of supercooling is much narrower and the rates of nucleation and crystal growth much more rapid. These factors result in a situation where nucleation and crystallization can occur with such rapidity at temperatures immediately below the zone of metastable supercooling that dwell periods of any substantial length within those respective temperature zones are unnecessary. Therefore, the simple cooling of the melt will act to produce a body having a uniformly fine-grained crystal dispersion therein. It is apparent, of course, that severe quenching of the molten glass could cool the mass at such a rapid rate through the necleation and crystallization regions that the desired glass-ceramic would not form.

U.S. Pat. No. 3,804,608 describes a number of compositions which can be formed into glassceramic articles without employing the reheating step required in the production of conventional glass-ceramic bodies, but no reference is made therein to bodies within the $Li_2O-Al_2O_3-SiO_2-F-TiO_2$ field having the compositions of the instant invention. Moreover, whereas the use of fluorine as an ingredient is noted therein, there is no mention of any purpose for its use so, a fortiori, there was no recognition of its utility in reducing the temperature at which crystallization will occur.

The compositions operable in the instant invention consist essentially, expressed in weight percent on the oxide basis as calculated from the batch, of about 4–7% $Li_2O$, 12–19% $Al_2O_3$, 60–70% $SiO_2$, 0.5–5% F, and 5–12% $TiO_2$. Although not mandatory, the presence of $B_2O_3$ and/or other alkali metal oxides ($Na_2O$ and/or $K_2O$) in individual amounts of up to about 5% and a total of not more than about 10%, is useful to stabilize the residual glass and to inhibit rapid and uncontrolled crystal growth. The inclusion of arsenic oxide in amounts up to about 1% is also useful to maintain the $TiO_2$ in the oxidized state, whereby the crystalline article will exhibit a white appearance, as well as to perform its usual function of a fining agent.

Minor additions of various compatible metal oxides can be tolerated but the total thereof will preferably not exceed about 5% by weight. Such materials include ZnO, MgO, BaO, CaO, SrO, and PbO. The first two can enter into the structure of the beta-spodumene crystals as will be explained hereinafter. The latter four ingredients appear to have no substantive effect upon the final product when present in small amounts. $ZrO_2$ may, perhaps, act as a secondary nucleant but substantial additions thereof hazard the presence of $ZrO_2$ crystals in the glass-ceramic. In general, the inclusion of $P_2O_5$ is avoided because it appears to simply form part of the residual glassy matrix. Its sometime function as a nucleating agent is not required.

Beta-spodumene is the high temperature form of alpha-spodumene which has the classic composition $Li_2O.Al_2O_3.4SiO_2$. Thus, "beta-spodumene" has been used to designate a crystal in the trapezohedral class of the tetragonal system, having the formula $Li_2O.Al_2O_3.4SiO_2$, and which is formed by heating alpha-spodumene to a conversion temperature in the vicinity of 700° C. Nevertheless, in the $Li_2O-Al_2O_3-SiO_2$ glass-ceramic materials, the crystal phase does not strictly conform to the naturally-occurring crystals. Instead, it is more in the nature of a solid solution corresponding generally to the formula $Li_2O.Al_2O_3.nSiO_2$, where "n" may vary from about 3.5 to 10. There is evidence that ions such as $Mg^{+2}$ and $Zn^{+2}$ can also appear in the crystal if present in the initial glass composition. Nonetheless, an X-ray diffraction pattern invariably indicates a crystal in the trapezohedral class in the tetragonal system. Hence, it has become customary in identifying glass-ceramics to term such crystals as beta-spodumene solid solution (s.s.) and that practice is followed here.

As is the case with the articles of United States Application Ser. No. 559,788, supra, filed in the names of G. H. Beall, P. E. Blaszyk, and W. T. Brydges, III, the molar ratio $Al_2O_3:Li_2O$ must be less than unity to achieve the desired uniformly fine-grained glass-ceramic article. Where that relationship does not exist, the resultant articles will normally be predominantly glassy or, in a few instances, will be fairly crystalline but the crystals, themselves, will be coarse-grained.

In general, the present glass-ceramic bodies demonstrate coefficients of thermal expansion over the temperature interval of room temperature (R.T.) to 500° C. of about $15-45 \times 10^{-7}$/° C. X-ray diffraction analysis and electron microscopy have shown the final body to be highly crystalline, most probably greater than 75% by volume crystalline, with beta-spodumene solid solution comprising the bulk of the crystallization with a minor amount, believed to be less than about 5% by volume, of rutile ($TiO_2$). The majority of the crystals has a diameter of one micron or less.

Table I reports glass compositions, expressed in weight percent on the oxide basis as calculated from the batch, which are operable in the present invention. The molar ratio $Al_2O_3:Li_2O$ in each is also recorded. Since it is not known with which cation(s) the fluorine is combined, it is recorded as fluoride (F) in accordance with glass analysis practice. The O≈F correction factor is also reported. The batch ingredients may comprise any materials, either the oxide or other compound, which, when melted together, will be converted into the desired oxide in the proper proportion. In the compositions tabulated, $AlF_3$ supplied the fluoride content.

The batch ingredients were ballmilled together to assist in securing a homogeneous melt and then placed into a platinum crucible. After covering, the crucible was moved to a gas-fired furnace operating at 1550° C. and the batch melted for 6 hours. About 20% of the fluorine was lost through volatilization. The melt was then poured into a graphite or steel mold to produce a slab about $6 \times 6 \times 0.5$. inch. The slab was allowed to cool in air in the ambient to about 800° C., as determined by means of an optical pyrometer, this requiring about 60 seconds. Thereafter, the slab was transferred to an annealer operating at 650° C. Upon being placed in the annealer, a hazy opalization began at the edges of the slab and moved toward the center thereof. When the opalization was completed, a wave of opaque crystallization occurred.

During the cooling step the molten batch appears to stiffen in the customary manner until a temperature of about 750°–900° C. is reached. At or somewhat below that temperature interval, a hazy opalization is observed at the surface of the slab and at the interface between the melt and the sides of the mold, which quickly moves toward the center of the slab. Almost immediately thereafter, crystal growth begins.

Experience has demonstrated that uniformly fine-grained crystallization will not be secured in the absence of this prior opalization phenomenon. Thus, the opalization provides efficient nucleation at high temperatures, i.e., about 100°–300° C. above the annealing point of the bulk glass. However, spontaneous opalization takes place in many glasses but unless one of the amorphous phases involved in the opalization is at least partially unstable as a glass and crystallites of some type are precipitated, there will be no spontaneous crystallization of the major glass components. In the present compositions, $TiO_2$ is apparently concentrated in one of the amorphous opal phases because, when $TiO_2$ is absent from the glass, neither opalization nor spontaneous crystallization is observed.

The rapid and spontaneous growth of beta-spodumene crystals upon the titanate nuclei is not completely understood. However, it is believed that crystallites are developed at temperatures well above the annealing point of the bulk glass during or just after the opalization phenomenon, thereby providing available nuclei while the glass is still within the temperature interval for maximum crystal growth. Fluorine appears to act as a mineralizer, i.e., the presence of fluorine accelerates crystal development.

spodumene solid solution with the minor amount of rutile appearing as needle-like crystals. It is quite apparent that the crystals have diameters of about one micron and less and the crystallinity exceeds 50% by volume.

The small number of rutile crystals observed is somewhat anomalous from the high $TiO_2$ levels in the parent glass. An explanation for this phenomenon is believed to be an entrapment of $Ti^{+5}$ ions in the spodumene network during rapid crystallization. Thus, tetrahedral titanium exists at high temperature in the glass network and it is theorized that the partition of $Ti^{+4}$ into octahedral coordination to form rutile may not be complete during the rapid crystallization.

TABLE II

| Example No. | Visual Description | Crystal Phases | Exp. Coef. | Modulus of Rupture |
|---|---|---|---|---|
| 1 | Fine-grained, smooth fracture, dull luster | Beta-spodumene s.s., Rutile | 28.6 | — |
| 2 | Very fine-grained, smooth shiny fracture | " | 21.3 | — |
| 3 | Fine-grained, smooth fracture | " | 41.4 | — |
| 4 | Fine-grained, smooth fracture, dull luster | " | 40.6 | 11,500 |
| 5 | " | " | 22.0 | 11,200 |
| 6 | Very fine-grained, satin luster | " | 18.5 | 9,700 |
| 7 | " | " | 20.5 | — |
| 8 | " | " | 24.4 | 7,700 |
| 9 | " | " | 25.5 | 11,000 |

TABLE I

| | 1 | 2 | 3 | 4 | 5 | 6 | 7 | 8 | 9 |
|---|---|---|---|---|---|---|---|---|---|
| $Li_2O$ | 5.1 | 5.2 | 4.8 | 4.8 | 6.4 | 5.2 | 5.3 | 6.1 | 5.2 |
| $Al_2O_3$ | 14.5 | 14.9 | 13.8 | 13.6 | 17.5 | 14.9 | 14.0 | 18.3 | 13.1 |
| $SiO_2$ | 65.8 | 67.6 | 62.3 | 61.9 | 63.4 | 67.4 | 68.3 | 62.9 | 69.3 |
| $B_2O_3$ | 3.0 | 1.8 | 2.9 | 2.9 | 3.1 | 3.1 | 3.1 | 3.1 | 3.1 |
| $TiO_2$ | 7.9 | 6.3 | 10.7 | 10.6 | 6.2 | 6.2 | 6.2 | 6.2 | 6.2 |
| $K_2O$ | 1.8 | 1.8 | 3.3 | 4.9 | 1.8 | 1.8 | 1.8 | 1.8 | 1.8 |
| F | 3.3 | 3.3 | 3.1 | 1.5 | 2.0 | 1.7 | 1.6 | 2.0 | 1.5 |
| $As_2O_5$ | — | 0.5 | 0.4 | 0.4 | 0.4 | 0.4 | 0.4 | 0.4 | 0.4 |
| | 101.4 | 101.4 | 101.3 | 100.6 | 100.8 | 100.7 | 100.7 | 100.8 | 100.6 |
| O ≈ F | −1.4 | −1.4 | −1.3 | −0.6 | −0.8 | −0.7 | −0.7 | −0.8 | −0.6 |
| | 100.0 | 100.0 | 100.0 | 100.0 | 100.0 | 100.0 | 100.0 | 100.0 | 100.0 |
| $Al_2(O,F)_3/Li_2O$ | 0.83 | 0.83 | 0.83 | 0.83 | 0.79 | 0.83 | 0.78 | 0.88 | 0.73 |

Table II presents a recapitulation of the internal microstructure and physical properties observed when the crystallized slabs were removed from the annealer. Hence, a visual description of the slab exterior and a fracture surface is tabulated along with the crystal phases as identified therein through X-ray diffraction analysis. The coefficient of thermal expansion ($\times 10^{-7}/°$ C.) over the temperature range of R. T. to 500° C. and the modulus of rupture (psi) are also reported as determined in accordance with standard measuring techniques.

Figure 2:
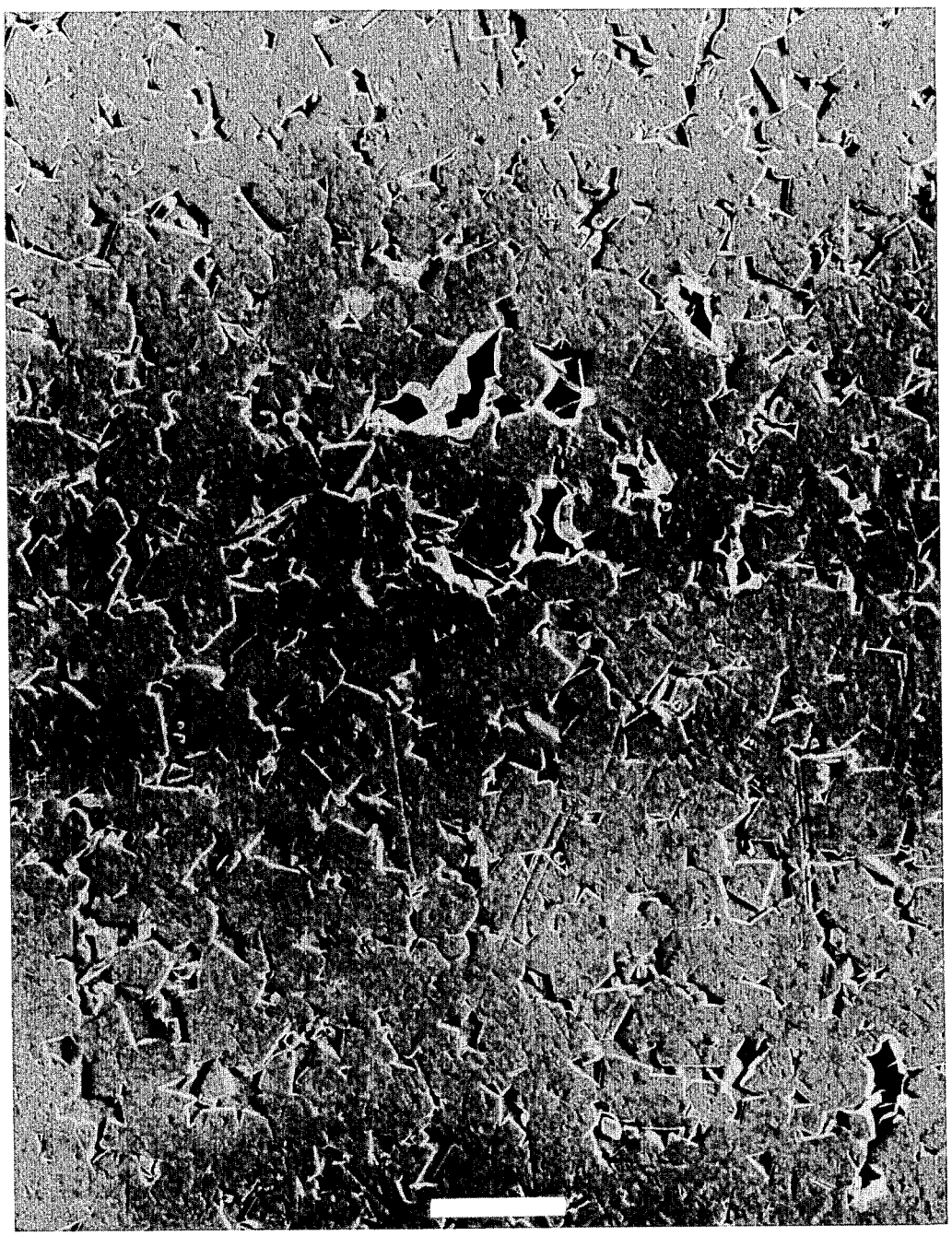

FIG. 2, a replica electron micrograph of the spontaneously-formed product of Example 6, illustrates the characteristic microstructure of the highly crystalline slabs. The white bar at the base of the micrograph represents a distance of one micron. The vast majority of the crystallization can be seen to consist of beta-a glass body shaped therefrom. Third, the glass body is exposed to a temperature between the annealing point of the glass and the temperature of phase separations and nucleation for a period of time sufficient to cause crystallization of the desired beta-spodumene solid solution. Fourth, the crystallized body is cooled to room temperature.

As can be recognized from the above description, the process of the instant invention contemplates four fundamental steps. First, a glass-forming batch within the above-outlined operable composition range is melted. Second, this melt is simultaneously cooled to a temperature about 100°–300° C. above the annealing point of the glass to obtain phase separation and nucleation and As has been explained hereinabove, the second or phase separation step is of critical importance to the operability of the invention. Thus, the rate of cooling the melt must not be so rapid that the required phase separation and nucleation will not have time to take place. With the compositions of the instant invention, laboratory experience has indicated that cooling rates between about 10°–1000° C./minute achieve satisfactory phase separation and nucleation. These phenomena commonly occur at temperatures between about 750°–900° C.

Inasmuch as the compositions of this invention crystallize very rapidly after the appearance of phase separation and nucleation, exposure times within the crystallization range of as little as 2 minutes may be sufficient to secure high crystallinity, i.e., greater than about 50% by volume of the body. In general, crystallization will take place at temperatures between about 600°–800° C., such being substantially lower than those reported by G. H. Beall, P.E. Blaszyk, and W. T. Brydges, III, supra, in Ser. No. 559,788. However, as was illustrated above in the working examples, ease in production has suggested that the phase separated and nucleated glass body be transferred to an annealer operating at a temperature within or slightly above the crystallization range and then cooled to room temperature therein.

Annealing techniques conventional in the glassmaking art are also useful here. Thus, as short a period as 0.5 hour can be sufficient with certain compositions, whereas the common practice would envision two hours or more. However, the length of anneal does not appear to have any substantive effect upon the features of the final product so extended annealing schedules are not deemed to be economically attractive.

It was explained above that the molar ratio $Al_2O_3$:$Li_2O$ is vital in the instant composition. For spontaneously-formed, uniformly fine-grained crystallization, that ratio must be less than one. MgO and ZnO can replace $Li_2O$ in the spodumene structure and in those instances where either or both of the former is present, the molar ratio $Al_2O_3$:($Li_2O$ + MgO + ZnO) should be less than unity. Hence, it appears that excess $LiO_2O$ above that necessary to form spodumene is required to secure spontaneous crystallization.

As illustrative of the criticality of the molar ratio $Al_2O_3$:$Li_2O$, the following composition comparison was undertaken. The glass tabulated below was melted in a platinum crucible at 1550° C. for 6 hours and poured into a steel mold to produce a 6 × 6 × 0.5 inch slab. The slab was allowed to cool in the ambient atmosphere to about 800° C. and then transferred to an annealer operating at 650° C.

Example 10

| | |
|---|---|
| $Li_2O$ | 4.3 |
| $Al_2O_3$ | 14.6 |
| $SiO_2$ | 68.7 |
| $B_2O_3$ | 3.1 |
| $TiO_2$ | 6.2 |
| $K_2O$ | 1.8 |
| F | 1.6 |
| $As_2O_5$ | 0.4 |
| | 100.7 |
| O ≈ F | −0.7 |
| | 100.0 |
| $Al_2(O,F)_3/Li_2O$ | 1.0 |

The final product exhibited a glassy fracture and appeared to be a translucent opal glass. X-ray diffraction analysis identified a minor amount of $TiO_2$ crystallization but no beta-spodumene solid solution.

Although the preferred mode of the invention involves crystallizing the article as the phase separated and nucleated glass body is cooled to room temperature, it is possible to cool the molten batch to room temperature at a rate so rapid that phase separation and nucleation will occur, but the desired fine-grained betaspodumene solid solution will not grow, such that the body is essentially glassy. However, fine-grained crystallization of that glassy body can be achieved by exposing it to a temperature within the crystallization interval in like manner to that described above with respect to the crystallization obtained as the melt is cooled to room temperature. Thus, here again, it is the occurrence of phase separation and nucleation at temperatures above the crystallization range which is of critical importance to the successful operation of the invention.

Finally, the mechanical strength of the crystallized bodies may be materially improved by utilizing a thermal tempering process such as is employed with glass articles. Hence, as is shown in Ser. No. 559,788, supra, filed concurrently herewith by Beall, Blaszyk, and Brydges, a comparison of the mechanical strength demonstrated by annealed crystallized articles with that exhibited by crystallized articles rapidly chilled from the crystallization range to room temperature can evidence a substantial enhancement in strength in the latter articles. The quick quenching can be especially effective when the crystallization is undertaken at the upper extreme of the crystallization range. Air tempering, viz., exposing the crystallized article to a blast of cold air to chill it to room temperature, is the preferred technique due to ease of practice and relative low cost, but immersion in various liquids such as oils and salt baths can also be operable.

The mechanism responsible for this improvement in mechanical strength has not been explained, but is believed to have foundation in the small amount of residual glass which is thought to be present as a continuous phase throughout the crystallized body. This theory is believed to find support in FIG. 2 wherein the residual glass is seen as small depressed areas due to its greater solubility in the etchant employed in preparing the replica electron micrograph.

I claim:

1. A method for making a highly crystalline glass-ceramic article consisting essentially of beta-spodumene solid solution and rutile crystals dispersed within a glassy matrix, said crystals constituting at least 50% by volume of said article, which comprises the steps of:
   a. melting a batch for a glass consisting essentially, by weight on the oxide basis as calculated from the batch, of about 4–7% $Li_2O$, 12–19% $Al_2O_3$, 60–70% $SiO_2$, 0.5–5% F, and 5–12% $TiO_{02}$, the molar ratio $Al_2O_3$:$Li_2O$ being less than one;
   b. simultaneously cooling said melt at a rate between about 10°–1000° C./minute to a temperature about 750°–900° C. to shape said melt into a glass body and obtain a phase separation and nucleation therein;

2. A method according to claim 1 wherein said time sufficient to cause crystallization is at least about two minutes.

3. A method according to claim 1 wherein said crystallized body is cooled to room temperature by means of a quick chilling technique to thermally temper said body.

* * * * *

UNITED STATES PATENT AND TRADEMARK OFFICE
CERTIFICATE OF CORRECTION

PATENT NO. : 3,985,533
DATED : October 12, 1976
INVENTOR(S) : David G. Grossman

It is certified that error appears in the above-identified patent and that said Letters Patent are hereby corrected as shown below:

Column 1, line 37, "bath" should be -- batch --.

Column 3, line 17, "glassceramic" should be -- glass-ceramic --.

Column 4, line 49, after "ambient" insert -- atmosphere --.

Column 6, line 9, "$Ti^{+5}$" should be -- $Ti^{+4}$ --.

Column 6, line 55, "separations" should be -- separation --.

Column 7, line 34, "$LiO_2O$" should be -- $Li_2O$ --.

Column 8, line 3, "betaspodumene" should be -- beta-spodumene --.

Column 8, line 50, Claim 1, "$TiO_{o2}$" should be -- $TiO_2$ --.

Column 8, line 57, Claim 1, insert the following: -- c. further cooling said shaped glass body and exposing said glass body to a temperature between about 600°-800°C. for a sufficient length of time to cause crystallization of beta-spodumene solid solution and rutile in said glass body; and then       d. cooling the crystallized body to room temperature. --.

Signed and Sealed this

First Day of March 1977.

[SEAL]

Attest:

RUTH C. MASON
Attesting Officer

C. MARSHALL DANN
Commissioner of Patents and Trademarks